(12) United States Patent
Schmitt et al.

(10) Patent No.: US 12,540,817 B2
(45) Date of Patent: Feb. 3, 2026

(54) SEGMENTING TRAJECTORY DATA

(71) Applicant: Robert Bosch GmbH, Stuttgart (DE)

(72) Inventors: Andreas Schmitt, Cologne (DE); Ming Gao, Harsum (DE); Oliver Roeth, Elze (DE)

(73) Assignee: ROBERT BOSCH GMBH, Stuttgart (DE)

( * ) Notice: Subject to any disclaimer, the term of this patent is extended or adjusted under 35 U.S.C. 154(b) by 194 days.

(21) Appl. No.: 18/550,638

(22) PCT Filed: Jun. 8, 2022

(86) PCT No.: PCT/EP2022/065457
§ 371 (c)(1),
(2) Date: Sep. 15, 2023

(87) PCT Pub. No.: WO2023/006284
PCT Pub. Date: Feb. 2, 2023

(65) Prior Publication Data
US 2024/0183658 A1 Jun. 6, 2024

(30) Foreign Application Priority Data
Jul. 26, 2021 (DE) .................... 10 2021 208 001.4

(51) Int. Cl.
*G01C 7/04* (2006.01)
(52) U.S. Cl.
CPC ..................... *G01C 7/04* (2013.01)
(58) Field of Classification Search
CPC .... G01C 7/04; G06T 2207/30241; G06T 7/13
(Continued)

(56) References Cited

U.S. PATENT DOCUMENTS 10,415,978 B2 * 9/2019 Yang .................. H04W 4/33
2008/0208454 A1 * 8/2008 Pesterev ............... G01C 21/26
701/467
(Continued)

FOREIGN PATENT DOCUMENTS

AU 2010317648 A1 * 7/2012 ............. G08G 5/727
DE 102004023399 A1 12/2005
(Continued)

OTHER PUBLICATIONS

Zhao, et al., "A method for simplifying ship trajectory based on improved Douglas-Peucker algorithm," Ocean Engineering, vol. 166, pp. 37-46 (https://www.sciencedirect.com/science/article/pii/S0029801818314872) (Year: 2018).*
(Continued)

*Primary Examiner* — Atul Trivedi
(74) *Attorney, Agent, or Firm* — NORTON ROSE FULBRIGHT US LLP

(57) ABSTRACT

A method of segmenting trajectory data using a controller. Trajectory data with a plurality of points are received. A Douglas-Peucker algorithm is applied to the trajectory data in order to ascertain substantially straight sections separated by segmentation points. An algorithm is used on the trajectory data in order to detect curves, in the form of starting points and end points of curves. At least one segmentation point ascertained in an interval between a starting point and an end point of a curve is replaced with the starting point and the end point. The trajectory data are segmented at the ascertained segmentation points, the starting points and the end points. A controller, a computer program, and a machine-readable storage medium are also described.

8 Claims, 3 Drawing Sheets

(58) Field of Classification Search
USPC .......................................................... 701/467
See application file for complete search history.

(56) References Cited

U.S. PATENT DOCUMENTS

| | | | | |
|---|---|---|---|---|
| 2010/0076640 | A1* | 3/2010 | Maekawa | G05D 1/0217 701/25 |
| 2016/0253566 | A1* | 9/2016 | Stein | G06T 7/60 348/148 |
| 2016/0325753 | A1* | 11/2016 | Stein | B60G 17/0182 |
| 2018/0149481 | A1* | 5/2018 | Hirai | G06T 19/003 |
| 2019/0086925 | A1 | 3/2019 | Fan et al. | |
| 2019/0302801 | A1* | 10/2019 | Zlot | H04W 4/46 |
| 2021/0188286 | A1* | 6/2021 | Ma | G01C 21/3407 |
| 2021/0215490 | A1* | 7/2021 | Mishra | G01C 21/3614 |
| 2021/0287554 | A1* | 9/2021 | Stepp | G08G 5/30 |
| 2022/0281598 | A1* | 9/2022 | Pescaru | G05D 1/106 |
| 2022/0284592 | A1* | 9/2022 | Pescaru | G06T 7/20 |
| 2024/0092357 | A1* | 3/2024 | Kobilarov | B60W 30/0956 |
| 2024/0174239 | A1* | 5/2024 | Narayanan | B60W 60/001 |

FOREIGN PATENT DOCUMENTS

| | | | | |
|---|---|---|---|---|
| DE | 102021208001 A1 * | 1/2023 | | G06T 7/13 |
| EP | 3385673 A1 | 10/2018 | | |
| JP | 2016212705 A | 12/2016 | | |
| WO | WO-2022185212 A1 * | 9/2022 | | G01S 13/933 |

OTHER PUBLICATIONS

Lv, et al., "Continuity Path Planning for UAV with Enhanced Douglas-Peucker Algorithm," 2024 IEEE International Conference on Unmanned Systems (ICUS), Nanjing, China, 2024, pp. 1757-1762, doi: 10.1109/ICUS61736.2024.10839909. (https://ieeexplore.ieee.org/document/10839909) (Year: 2024).*
International Search Report for PCT/EP2022/065457, Issued Oct. 7, 2022.
Banerjee et al., "Dynamics Based Trajectory Segmentation for UAV Videos," Advanced Video and Signal Based Surveillance (AVSS), 2010 Seventh IEEE International Conference on, IEEE, 2010, pp. 345-352. <https://sci-hub.ru/10.1109/avss.2010.23> Downloaded Sep. 12, 2023.
Laass et al., "Improving Persistence Based Trajectory Simplification," 2021 22nd IEEE International Conference on Mobile Data Management (MDM), IEEE, 2021, pp. 1-6. <https://www.bgd.ed.tum.de/pdf/2021_MDMPersistenceSDS_Laass.pdf> Downloaded Sep. 12, 2023.
Lin et al., "Noise Filtering, Trajectory Compression and Trajectory Segmentation on GPS Data," 11th International Conference on Computer Science & Education (ICCSE), IEEE, 2016, pp. 490-495. <https://sci-hub.ru/10.1109/iccse.2016.7581629> Downloaded Sep. 12, 2023.
Banerjee, et al.: "Dynamics based Trajectory Segmentation for UAV videos," 2010 7th International Conference on Advanced Video and Signal Based Surveillance (AVSS), IEEE, Piscataway, NJ, USA, (2010). pp. 345-352, XP031772045.
Laass, et al.: "Improving persistence based trajectory simplification," 2021 22nd IEEE International Conference on Mobile Data Management (MDM), IEEE, (2021), pp. 157-162, XP033938584.
Lin, et al.: "Noise Filtering, Trajectory Compression and Trajectory Segmentation on GPS data", The 11th Int'l Conference on Computer Science & Education (ICCSE 2016), IEEE, 2016, Japan, pp. 490-495, XP032975301.

* cited by examiner

SEGMENTING TRAJECTORY DATA

FIELD

The present invention relates to a method for segmenting trajectory data. The present invention additionally relates to a controller, to a computer program, and to a machine-readable storage medium.

BACKGROUND INFORMATION

A trajectory refers to a sequence of time-stamped positions recorded in a particular coordinate system. An example of this is a vehicle trajectory recorded with sequential geographic coordinates based on GNSS. The segmentation of trajectories is directed at dividing given trajectories into portions and/or blocks that have consistent geometrical properties, such as direction and linearity. The segmentation is applied in different areas, such as when creating planning maps with crowd-sourced trajectory data, where trajectory segmentation allows for scaling over any area size.

Typically, the segmentation of trajectories focuses on locating trajectory points and positions whose geometric properties become inconsistent compared to their neighboring points, then these points are registered as segmentation points. The segmentation points form a boundary between two segmentations or blocks. Methods for segmenting trajectories are described in the related art. For example, trajectories can be divided or segmented into segments of equal length. Furthermore, a linearity of the given trajectories may be exploited to ascertain the minimum number of segmentation points.

However, conventional methods are problematic in that segmentation points are often defined within curves or straight trajectory sections are divided into too high a plurality of segments.

SUMMARY

The task underlying the present invention can be seen in providing a method for dividing trajectory data into segments by which the segmentation of curve sections is avoided.

This object may be achieved by features of the present invention. Advantageous embodiments of the present invention are disclosed herein.

According to an aspect of the present invention, a method of segmenting trajectory data, in particular by a controller, is provided. In one step, trajectory data with a plurality of points are received. The points may be position points that each have a timestamp.

According to an example embodiment of the present invention, to ascertain substantially straight sections separated by segmentation points, a curve smoothing and/or generalization algorithm, such as a Douglas-Peucker algorithm, is applied to the trajectory data. This simplifies a shape or geographic path of the trajectory data, such that segmentation points for splitting the trajectory data into curve sections are formed.

In a further step, an algorithm for detecting curves, particularly in the form of starting points and end points of curves, is applied to the trajectory data. Using such an algorithm, curve sections and a length of the curve sections are detected.

At least one segmentation point ascertained in an interval between a starting point and an end point of a curve is replaced by the starting point and the end point. Thus, segmentation of trajectory data within curve sections is prevented. Such segmentation points within a curve section are thus deleted and replaced by a starting point of the curve section and an end point of the curve section respectively.

The trajectory data are segmented at the ascertained segmentation points, the starting points and the end points.

The method combines algorithms for curve smoothing and/or generalization with algorithms for the detection of curves or curve sections. In so doing, the results of the respective algorithms may be fused together to prevent forming segmentation points within curve sections and within straight sections of the trajectory data. In particular, the curve detection algorithm may prevent a curve from being segmented in its center by taking into account the consistency of the course changes of the trajectory data.

The method according to the present invention is applied separately to each set of trajectory data and thus can process multiple sets of trajectory data in parallel simultaneously. A set of trajectory data may be a group of measurement data of a vehicle, a group of measurement data of a geographic area, a predefined number of measurement data, and the like.

According to a further aspect of the present invention, a controller is provided, wherein the controller is configured to perform the method of the present invention. The controller may be, for example, a vehicle onboard controller, a vehicle offboard controller, or a vehicle offboard server unit, such as a cloud system, for example. The controller may preferably receive and process the trajectory data. For this purpose, the controller may comprise an internal or external memory in order to be able to temporarily or permanently store the trajectory data and the results of the method.

Furthermore, according to an example embodiment of the present invention, the controller may have an integrated communication unit or an external communication unit to receive the trajectory data and send the segmented trajectory data as a possible result of the method.

Moreover, according to one aspect of the present invention, a computer program is provided comprising instructions that, when executed by a computer or controller, cause the computer or controller to perform the method according to the present invention. According to another aspect of the present invention, a machine-readable storage medium is provided on which the computer program according to the present invention is stored.

In one embodiment of the present invention, the curve detection algorithm ascertains a course direction for each point and subsequently a difference in course direction between two successive points respectively. A point of the trajectory data is assigned to a curve or curve section if the difference in the course direction between the point and the next point exceeds a predefined threshold value. In this way, a detection of curve sections can be realized in a technically simple manner. The points of the trajectory data on straight sections are filtered out as points with relative course directions below the threshold.

According to another embodiment of the present invention, the course direction is ascertained in the form of a vector between a first point and a subsequent second point by way of a yaw angle. In trajectory data of vehicles, this corresponds to a direction of travel of the vehicle starting from the first point towards the second point. The yaw angle may be ascertained with respect to a predefined cardinal direction or a reference direction.

According to a further exemplary embodiment of the present invention, the difference in the course direction is standardized by a distance between the first point and the second point. This measure can enable additional curve smoothing and comparability of the ascertained course directions of the different points.

According to another exemplary embodiment of the present invention, for the points exceeding the predefined threshold value, adjacent points not exceeding the threshold value are defined as starting points or end points of a curve and used as segmentation points for splitting the trajectory data into sections. Thus, an unambiguous starting point and an unambiguous end point of a curve or a curve section can be ascertained. As soon as there are no or only slight differences in the course direction between two adjacent points of the trajectory data, these will not exceed the threshold value and are assigned to a straight section by the method and no longer to a curve section.

According to a further exemplary embodiment of the present invention, the trajectory data segmented at the ascertained segmentation points, the starting points and the end points, are received at least in segmentwise fashion and used to control a vehicle. The trajectory data can thereby be received segment by segment and used for vehicle control. A plurality of segments can also be received simultaneously in order to depict, for example, a planned trajectory or a portion of the planned trajectory.

Preferred exemplary embodiments of the present invention are described in greater detail below, with reference to highly simplified schematic illustrations.

DETAILED DESCRIPTION OF EXAMPLE EMBODIMENTS

Figure 1:
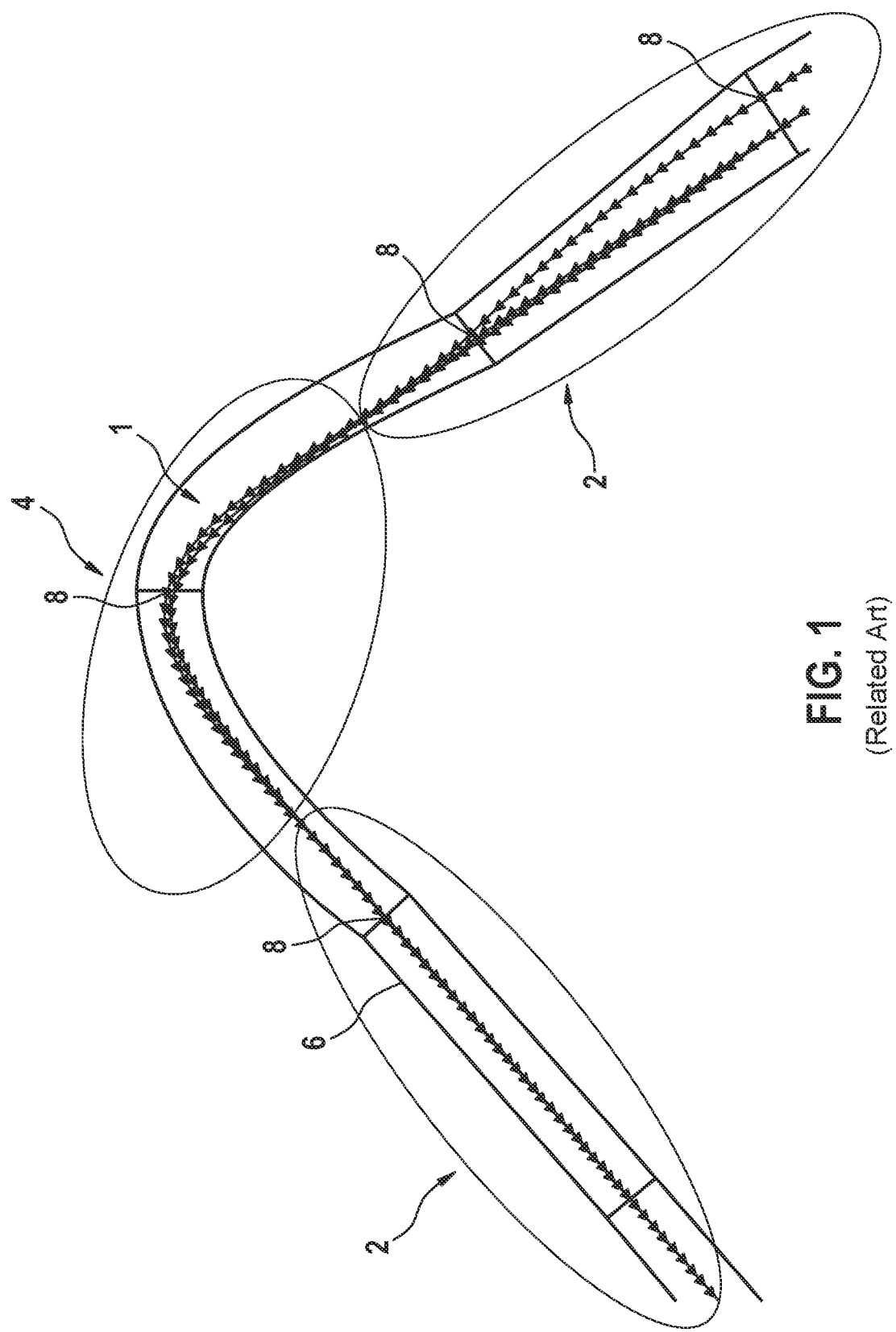
FIG. 1 shows a representation of segmented trajectory data according to the related art.

In FIG. 1, a representation of segmented trajectory data according to the related art is shown. The straight sections 2 and the curve sections 4 of the trajectory data 1 are divided into different segments 6. The trajectory data 1 may subsequently be processed further in the form of segments 6 or provided to road users (not shown).

To divide the trajectory data 1, segmentation points 8 must be detected, at which boundaries between two segments 6 are drawn. As can be seen in FIG. 1, the segmentation of the trajectory data 1 takes place in uniform, elongated segments 6, which also have boundaries within curve sections 4. If a road user uses such segmented trajectory data 1, there may be delays in processing. This can adversely affect road safety in complicated traffic situations, as in the curves. Furthermore, the straight sections 2 are unnecessarily split into a plurality of segments 6.

Figure 4:
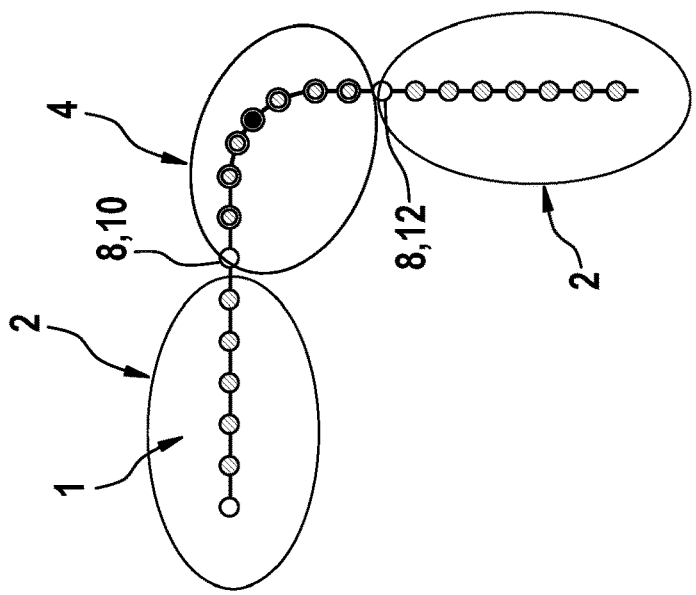
FIGS. 2-4 schematic top views illustrating a method according to the present invention, according to one example embodiment.
Figure 3:
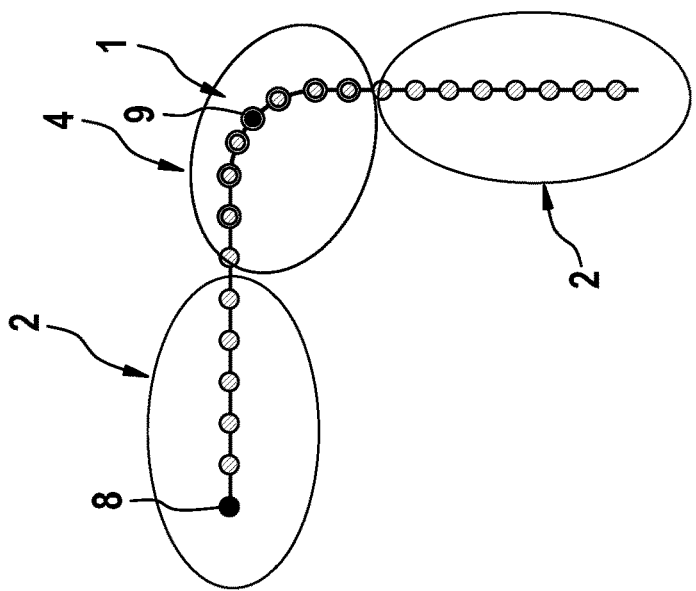
Figure 2:
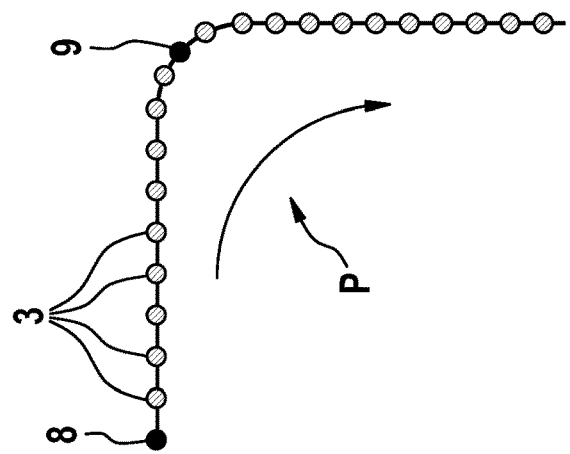

In FIGS. 2 to 4, schematic top views are shown for illustrating a method according to the present invention according to one embodiment. In FIG. 2, a direction of movement is illustrated by an arrow P along which the trajectory data 1 were ascertained and along which the processing of the trajectory data 1 is carried out by the method. The method may be performed by a controller (not shown), which may be configured internally or externally to the vehicle.

In a first step, the trajectory data 1 are received with a plurality of points 3. For this purpose, a detailed view showing only one trajectory is shown in FIGS. 2 to 4. However, the trajectory data 1 may also be composed of a plurality of trajectories and have a plurality of points 3 that are also superimposed.

To ascertain substantially straight sections separated by segmentation points 8, 9, a curve smoothing and/or generalization algorithm, such as a Douglas-Peucker algorithm, is applied to the trajectory data 1. The corresponding result is shown in FIG. 2. Two segmentation points 8, 9 are shown as examples.

In a second step, which is illustrated in FIG. 3, an algorithm for detecting curves and curve sections 4, in particular in the form of starting points 10 and end points 12 of curve sections 4, are applied to the trajectory data 1.

The algorithm for detecting curve sections 4 ascertains a course direction for each point 3 and subsequently a difference in the course direction between two consecutive points. A point 3 of the trajectory data 1 is assigned to a curve or to a curve section 4, if the difference in the course direction between the point 31 and the next point 32 exceeds a predefined threshold value. This is explained in more detail in FIG. 5.

In a further step of the method, at least one segmentation point 8, 9 ascertained in an interval between a starting point 10 and an end point 12 of a curve section 4 is replaced by the starting point 10 and the end point 12. The corresponding segmentation point 9 is deleted or is at least no longer used as a segmentation point 9.

Subsequently, the trajectory data 1 are segmented into segments 6 at the ascertained segmentation points 8, the starting points 10 and the end points 12.

Figure 5:
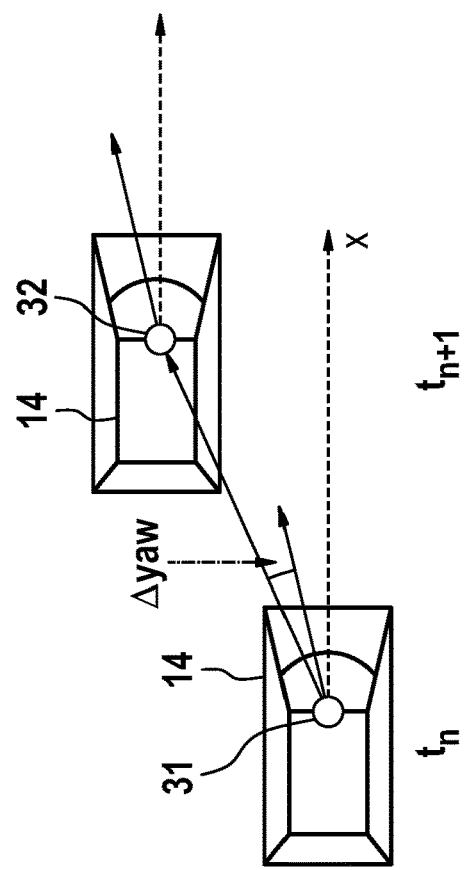
FIG. 5 shows schematic top views for clarifying an algorithm for detecting curves.
Figure 5:
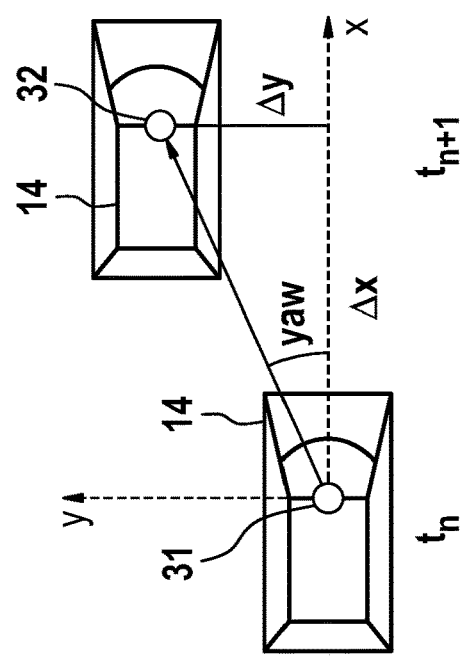

FIG. 5 shows schematic top views for illustrating an algorithm for detecting curve sections 4. A course direction in the form of a yaw angle yaw is ascertained at a first point 31 with a first timestamp $t_n$. The second point 32 has a second timestamp $t_{n+1}$.

The trajectory data 1 are ascertained, by way of example, by a vehicle 14 traveling a route. The different points 31, 32 are traversed at different times t and provided with corresponding timestamps.

In the illustrated exemplary embodiment, the yaw angle yaw is measured against a horizontal axis x, which may be, for example, an east-west connection line. In the exemplary embodiment shown, the yaw angle can be calculated by the arctangent of a quotient of a vertical offset $\Delta y$ and a horizontal offset $\Delta x$ to a subsequent second point 32.

The yaw angles yaw are calculated for each point 3 with a subsequent point. In a further step, relative course changes $\Delta yaw$ between the respective points 3 are calculated. This is implemented by forming a difference between the respective yaw angles yaw.

The relative course changes $\Delta yaw$ of each trajectory point 3 may also be accumulated with the values of those points 3 that are within a predefined distance parameter. The accumulated angular value of each trajectory point may additionally be smoothed with a predetermined averaging width. These two steps make it possible to highlight points 3 that have a continuous course change, while suppressing points 3 of the trajectory data 1 that have a relatively constant direction of movement, as for example on straight sections 2. By marking the points whose smoothed relative course directions or course changes $\Delta yaw$ exceed a certain angle threshold value, curves may be detected in the given trajectory.

The invention claimed is:

1. A method for segmenting trajectory data using a controller, the method comprising the following steps:

receiving trajectory data with a plurality of points;

applying to the trajectory data a curve smoothing and/or generalization algorithm to ascertain substantially straight sections separated by segmentation points;

applying to the trajectory data an algorithm for detecting curves in the form of starting points and end points of curves;

replacing at least one segmentation point ascertained in an interval between a starting point and an end point of a curve with the starting point and the end point;

wherein the trajectory data are segmented at the ascertained segmentation points, the starting points, and the end points, and wherein the trajectory data segmented at the ascertained segmentation points, the starting points, and the end points, are received at least in segmentwise fashion and are used for controlling a vehicle.

2. The method according to claim 1, wherein the curve smoothing and/or generalization algorithm is a Douglas-Peucker algorithm.

3. The method according to claim 1, wherein the algorithm for detecting curves ascertains a course direction for each point and subsequently a difference of the course direction between each two consecutive points, wherein each point of the trajectory data is assigned to a curve when the difference of the course direction between the point and the following point exceeds a predefined threshold value.

4. The method according to claim 3, wherein the course direction is ascertained in the form of a vector between a first point and a subsequent second point by way of a yaw angle.

5. The method according to claim 4, wherein the difference in the course direction is standardized by a distance between the first point and the second point.

6. The method according to claim 3, wherein for those points of the trajectory data exceeding the predefined threshold value, adjacent points not exceeding the threshold value are defined as starting points or end points of a curve and are used as segmentation points for splitting the trajectory data into segments.

7. A controller configured to segment trajectory data, the controller configured to:

receive trajectory data with a plurality of points;

apply to the trajectory data a curve smoothing and/or generalization algorithm to ascertain substantially straight sections separated by segmentation points;

apply to the trajectory data an algorithm for detecting curves in the form of starting points and end points of curves;

replace at least one segmentation point ascertained in an interval between a starting point and an end point of a curve with the starting point and the end point;

wherein the trajectory data are segmented at the ascertained segmentation points, the starting points, and the end points, and wherein the trajectory data segmented at the ascertained segmentation points, the starting points, and the end points, are received at least in segmentwise fashion and are used for controlling a vehicle.

8. A non-transitory machine-readable storage medium on which is stored a computer program for segmenting trajectory data using a controller, the computer program, when executed by a computer or controller, causing the computer or controller to perform the following steps:

receiving trajectory data with a plurality of points;

applying to the trajectory data a curve smoothing and/or generalization algorithm to ascertain substantially straight sections separated by segmentation points;

applying to the trajectory data an algorithm for detecting curves in the form of starting points and end points of curves;

replacing at least one segmentation point ascertained in an interval between a starting point and an end point of a curve with the starting point and the end point;

wherein the trajectory data are segmented at the ascertained segmentation points, the starting points, and the end points, and wherein the trajectory data segmented at the ascertained segmentation points, the starting points, and the end points, are received at least in segmentwise fashion and are used for controlling a vehicle.

\* \* \* \* \*